United States Patent [19]

Blessing

[11] Patent Number: 4,473,814
[45] Date of Patent: Sep. 25, 1984

[54] LINEAR POTENTIOMETER

[75] Inventor: Fritz Blessing, Ostfildern, Fed. Rep. of Germany

[73] Assignee: Novotechnik KG Offterdinger GmbH & Co., Ostfildern, Fed. Rep. of Germany

[21] Appl. No.: 508,695

[22] Filed: Jun. 28, 1983

[30] Foreign Application Priority Data

Jun. 28, 1982 [DE] Fed. Rep. of Germany ... 8218497[U]

[51] Int. Cl.³ .......................................... H01C 10/38
[52] U.S. Cl. .................................. 338/176; 338/184; 338/183; 338/117; 338/194
[58] Field of Search ............... 338/176, 160, 194, 199, 338/117, 133, 118, 184, 183, 202, 180, 181, 182; 308/3.5 R, 3.4, 3.3

[56] References Cited

U.S. PATENT DOCUMENTS

| | | | |
|---|---|---|---|
| 2,780,702 | 2/1957 | Bouras | 338/199 X |
| 2,813,183 | 11/1957 | Gearheart et al. | 338/199 X |
| 2,831,094 | 4/1958 | Bouras et al. | 338/125 |
| 2,857,497 | 10/1958 | Bouras et al. | 338/199 X |
| 2,863,031 | 12/1958 | Gottschall et al. | 338/183 |
| 2,900,615 | 7/1969 | Gottschall et al. | 338/176 |
| 2,902,663 | 9/1959 | Abatemarco et al. | 338/176 |
| 3,026,493 | 3/1962 | Treff | 338/183 |
| 3,029,404 | 4/1962 | Huard | 338/117 |
| 3,364,454 | 1/1968 | Froebe | 338/183 X |
| 4,053,865 | 10/1977 | Brown, Jr. | 338/184 X |

Primary Examiner—Roy N. Envall, Jr.
Assistant Examiner—Christopher N. Sears
Attorney, Agent, or Firm—Edwin E. Greigg

[57] ABSTRACT

A linear potentiometer, having a longitudinal housing with a resistance path and with a wiper guided by a push rod sliding therein. The push rod is supported at its entry into the housing of the potentiometer via a slide bearing which contains an elastic ring element, preferably an O-ring. This ring element embodies the sole connection between a stationary outer bearing and an inner bearing which is movable in a swinging manner relative to the outer bearing because of the elastic connection. The push rod slides in the inner bearing. The inner and outer bearings, by means of opposing annular grooves, receive the elastic ring element connecting them.

7 Claims, 1 Drawing Figure

U.S. Patent  Sep. 25, 1984  4,473,814
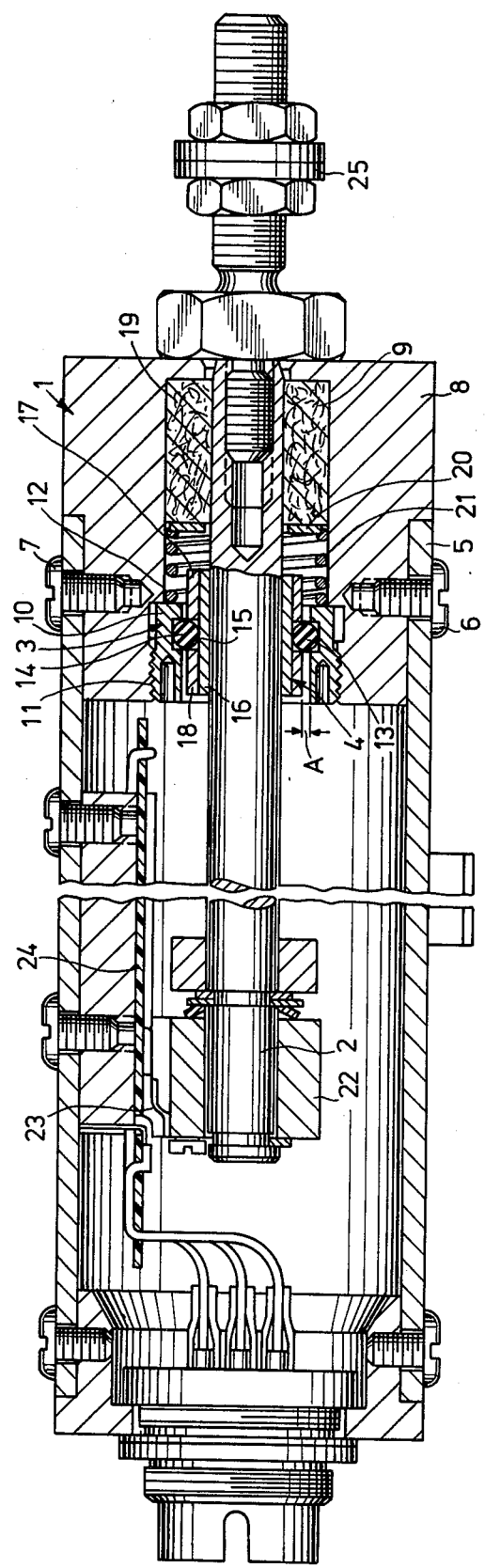

LINEAR POTENTIOMETER

BACKGROUND OF THE INVENTION

The invention relates to an improvement in a linear potentiometer.

In such linear potentiometers, it is known to support a resistance path in a stationary manner in the interior of a housing, which by way of example is tubular, and to cause a wiper contact to slide over this resistance path. Thus the wiper is simultaneously in continuous contact with a parallel pickup path, so that the potential picked up from the resistance path can be transmitted to the outside via the pickup path. The wiper is secured to a push rod which is supported in a longitudinally displaceable manner in the housing. A main bearing is provided at the point where the push rod enters the housing. Conventionally, such bearings are embodied as slide bearings, for instance with the aid of plastic sleeves or the like; but in that case a substantial disadvantage may arise. These bearings will shift out of their proper position comparatively quickly, since it is very difficult if not impossible for the user of the potentiometer to grasp the push rod exactly on the axial center and thereby to avoid any sort of shifting, whether parallel or at an angle. If the push rod is grasped off-center or at an angle, however, a tilting of the main bearing at its entry into the housing necessarily follows, causing the deflection or even the destruction of this bearing.

In linear potentiometers of this kind, whether they are relatively long or short (lengths of a meter or more are not infrequent), it is also possible that the push rod may bend of its own weight, either inside the housing if it is pushed all the way in or outside the housing, so that again the push rod is not in an exactly axially parallel position with respect to its main bearing. Such tilting or shifting is not only disadvantageous in the sense that the bearing may be destroyed, it can also exert negative influences on the functioning of the potentiometer. For instance, if a relatively long, round rod is inserted obliquely into a sleeve-like bearing, the result is a phenomenon which is readily recognizable from general experience and which expresses itself in the form of a shuddering or jerking motion as the rod is inserted or retracted. The reason for this is that the housing of the potentiometer practically assures a linear guidance for the push rod, and if the push rod is tilted as it is introduced it tends to jam in the main bearing because of this tilting. A relatively large amount of force must then be brought to bear in order to move the push rod an additional distance, whereupon it jams again, and so forth.

OBJECT AND SUMMARY OF THE INVENTION

It is accordingly an object of the invention to embody a front main support, where the push rod enters or exits from the housing, in a linear potentiometer such that it is possible to compensate without difficulty for incorrect grasping of the push rod by the drive means, for possible angular shifting and even to a limited extent for parallel shifting, and such that the push rod slides smoothly and without jerking in its bearing.

This object is attained by the linear potentiometer according to the invention with the advantage that even pronounced skewing and tilting of the push rod, caused by a failure to grasp it on its axial center or by parallel or angular shifting, can be compensated for and absorbed. A particularly advantageous feature is the smoothly sliding and jerk-free operation of the push rod which is assured by the bearing according to the invention, and another is that although the bearing of the push rod effects unequivocal and sure guidance, it is still capable of reacting in an elastically yielding manner to interruptions, off-center operation or other influences and to reliably absorb and eliminate such influences without communicating them to other elements of the apparatus.

It is further particularly advantageous that the structure is simple and trouble free. A conventional O-ring can be used for attaining a swingingly suspended inner bearing, in order to effect the sliding guidance of the push rod directly.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing is a partially cutaway view showing a longitudinal section through a linear potentiometer according to the invention.

DESCRIPTION OF THE PREFERRED EMBODIMENT

The basic concept of the present invention is the subdivision of the main bearing area, that is, the location where the push rod 2 passes through the corresponding end of the housing, which is marked 1 in the drawing, into an outer bearing 3 which is stationary with respect to the push rod and an inner bearing 4 which is suspended and swings relative to the outer bearing 3. This subdivision is such that the push rod 2 is capable of executing the shifting and twisting movements mentioned above, because such movements can be absorbed in an elastically yielding manner by the inner bearing 4 while the centered guidance of the push rod continues to be maintained.

In detail, the housing shown in the drawing includes a tubular jacket 5 having a closure bearing block 8 at its right end, as viewed in the drawing, secured to it via screws 6 and 7 by way of example. The bearing block 8 has a central, stepped passageway bore 9, in which the outer bearing 3 and the inner bearing 4 are disposed.

The outer bearing 3 is embodied by a bearing ring 10, which at 11 is screwed with an external thread into a corresponding internal thread of the passageway bore 9 of the bearing block 8, in this case being inserted as far as a stop embodied by a shoulder 12 of the bore 9. An essential feature of the bearing ring 10 is that this ring 10 has an internal annular grove 13, which may be embodied as an elastomeric ring and in this specialized application is a conventional O-ring. This O-ring 14, as this elastic ring element will henceforth be called, is the sole connecting and bearing element between the outer bearing 3 and the inner bearing 4. Accordingly, the O-ring 14 is held by the inner bearing 4, again by means of an outwardly facing annular groove 15. The depth of the two annular grooves 13 and 15 in the outer bearing 3 and the inner bearing 4 is dimensioned respectively such that the O-ring 14 is not capable of deflection, for instance in response to severe crushing, but instead is securely held against axial displacement, preferably with a slight axial play. It is clearly visible in the drawing that there is an inside distance A between the outer annular surface of the inner bearing 4 and the inner annular surface of the outer bearing 3. As may be seen in the drawing, this distance A enables a substantial amount of tilting and twisting with the overall result of a swinging suspension of the inner bearing 4 with respect to the outer bearing 3. As a result of the inherent elasticity of the O-ring 14, a slight parallel shifting of the inner bearing 4 with respect to the outer bearing 3 is also possible, it being understood that the push rod 2 is in that case guided in a generally sleeve-like inner bearing in the form of a conventional slide bearing having appropriate tolerances.

The details of the structure of the sleevelike inner bearing are that an inner sleeve 16 is provided which assures the sliding support and guidance of the push rod 2. A first annular bearing sheath 17 is then first pressed onto this sleeve 16 from one end; since the sleeve which is preferably used is slotted sleeve made by the rolling together of a strip of material, its round shape is also imparted to it when the first bearing sheath is pressed onto it. The receiving groove 15 for the O-ring is then produced by pushing on a second bearing sheath 18 from the other end, and the O-ring 14 is held on the sleeve 16 between these two bearing sheaths 17 and 18.

The bearing as a whole is completed by a felt 19 of suitable dimensions which is first inserted from inside into the bore 9 of the bearing block 8. This felt 19 serves as a wiper for the push rod 2 and is compressed by a spring 21 via a shim 20, so that the felt 19 surrounds the push rod 2 closely, but of course appropriately elastically, so that the swinging support just described does come into effect. The spring 21 abuts at its other end and end face of the bearing ring 10.

It will be understood that to assemble this swinging support with the inner and outer bearings, the procedure must be such that the O-ring 14 is first inserted into the inner groove 13 on the bearing ring 10, which can be accomplished without difficulty because the O-ring can recover after being compressed and crimped. Then the sleeve 16, already provided with one of the bearing sheaths 17 or 18 pressed onto it, is inserted until the O-ring 14 comes to rest on the pressed-on bearing sheath 17 or 18. Then the second bearing sheath 18 or 17 is pushed onto the sleeve 16 and the O-ring 14 is thus fixed in position in order to assure the secure but swingingly yielding support of the inner bearing 4 in the outer bearing 3. It is then possible, after the felt 19 with the shim 20 and the spring 21 has been emplaced, to screw the bearing ring 10 into the bearing block 8 and to introduce the push rod 2 into the sleeve 16.

The other parts of the linear potentiometer shown in the drawing need not be described further, because they are not the subject of the invention. It can be seen, however, that at the other end area of the housing there is a sliding part 22, which slides in the housing interior in a manner not shown and supports both the push rod 2 and the actual wiper 23, which slides on the resistance path 24. The push rod 2 is supported rotatably overall, that is, in the sliding part 22 as well, and on its end extending from the housing it also has suitable fastening means 25 for use, by way of example, with a moving machine part.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A linear potentiometer comprising a longitudinal housing having a resistance path internally mounted therein, wiper means in sliding contact with said resistance path, said wiper means being guided by a push rod that is supported at its entry into the housing by a slide bearing means, said slide bearing means including a stationary outer bearing and an inner bearing radially spaced from the outer bearing, said inner bearing being movable in swinging fashion relative to the outer bearing, and an elastic ring element simultaneously held in opposing annular grooves of the outer and inner bearings and forming the sole connection therebetween, said push rod sliding in the inner bearing.

2. A linear potentiometer as defined in claim 1, wherein the outer bearing comprises a bearing ring retained in a closure block on the said housing, said bearing ring having a recess forming said outer bearing groove, into which recess the elastic ring element is inlaid with only slight axial clearance.

3. A linear potentiometer as defined by claim 1 wherein said inner bearing is embodied as a sliding bearing sleeve for guiding said push rod, onto which sleeve bearing sheaths are pressed at either end, the inner elastic ring element surface being interposed between said bearing sheaths.

4. A linear potentiometer as defined by claim 2, wherein said inner bearing is embodied as a sliding bearing sleeve for guiding said push rod, onto which sleeve bearing sheaths are pressed at either end, the inner elastic ring element surface being interposed between said bearing sheaths.

5. A linear potentiometer as defined by claim 1, wherein a wiper felt is inlaid into a stepped bore receiving the inner and outer bearings in said closure bearing block on the housing, said felt being compressed by a pre-stressing spring abutting an end face of the outer bearing.

6. A linear potentiometer according to claim 2, wherein a wiper felt is inlaid into a stepped bore receiving the inner and outer bearings in said closure bearing block on the housing, said felt being compressed by a prestressing spring abutting an end face of the outer bearing.

7. A linear potentiometer according to claim 3, wherein a wiper felt is inlaid into a stepped bore receiving the inner and outer bearings in said closure bearing block on the housing, said felt being compressed by a prestressing spring abutting an end face of the outer bearing.

* * * * *